March 31, 1970  H. M. STAHR  3,504,237
ELECTROLYTIC CAPACITOR AND ELECTROLYTE THEREFOR
Filed Oct. 26, 1967
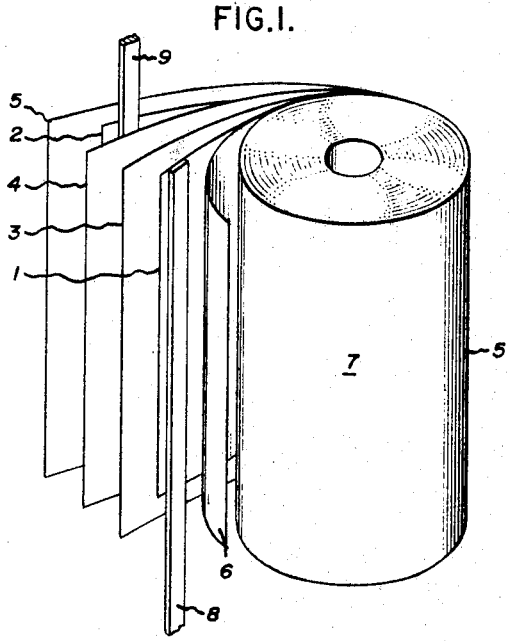
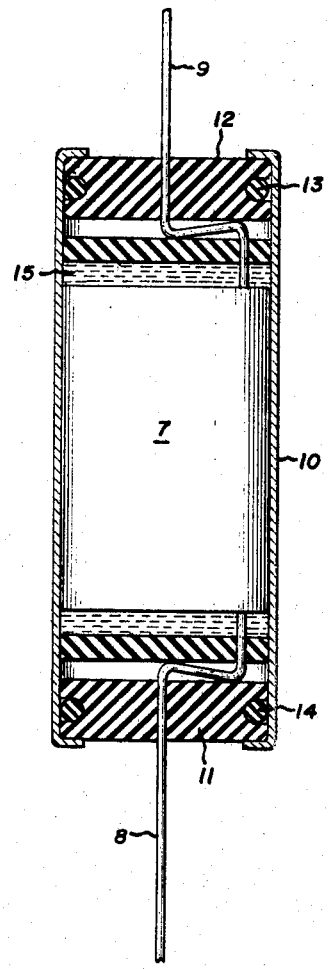
INVENTOR:
HENRY M. STAHR,
BY *James K. Lichiello*
HIS ATTORNEY.

United States Patent Office 3,504,237
Patented Mar. 31, 1970

3,504,237
ELECTROLYTIC CAPACITOR AND
ELECTROLYTE THEREFOR
Henry M. Stahr, Richmond, Va., assignor to General
Electric Company, a corporation of New York
Filed Oct. 26, 1967, Ser. No. 678,322
Int. Cl. H01g 9/00, 9/02
U.S. Cl. 317—230                               11 Claims

ABSTRACT OF THE DISCLOSURE

An electrolyte for an electrolyte capacitor comprising an ammonium salt, a solvent and tetra-methyl-guanidine.

The present invention relates to electrolytic capacitors, and more particularly to an improved fill electrolyte therefor which is effectively and reliably operative at high temperatures.

With the development of electrical equipment designed for use in increasingly higher temperature environments, there has been an increased demand for electrical components, including capacitors, which are capable of reliable operation under elevated temperatures, for example at about 125° C. or higher.

While capacitor working or fill electrolytes comprising conventional ammonium salts, such as formates, borates, acetates, and the like, have proven satisfactory in the past, for moderate temperature operation, it has been found that these electrolytes are thermally unstable and that many of them begin to lose ammonia at temperatures as low as 85° C. At this and higher temperatures, excessive internal pressure builds up within the capacitor, electrolyte is lost from the capacitor, and electrical properties of the capacitor deteriorate rapidly. Hence, capacitors using these electrolytes are unsuitable for use and cannot meet the demands placed on components in the above-mentioned high temperature environments.

Accordingly, it is a general object of the invention to provide an electrolytic capacitor and an electrolyte therefore of the type described, which overcomes the above-mentioned problems associated with electrolytic capacitors and electrolytes therefor.

Another object of the invention is to provide a capacitor fill electrolyte of the type described, which is thermally stable at temperatures of about 125° C. and higher. A related object is to provide electrolytic capacitors having highly stable electrical characteristics as a function of time, temperature and voltage.

Other objects and advantages of the invention will become apparent from the following description and the appended claims.

With the above object in view, the invention in a broad sense relates to an electrolytic capacitor having a pair of electrodes, at least one of which is composed of a film-forming metal, and an electrolyte comprising an ammonium salt, a solvent (non-aqueous or semi-aqueous) and tetramethyl-guanidine.

The solvent mixture may be modified by the addition thereto of other materials, such as the organic compounds hereinafter described, for varying the properties of the electrolyte in the desired manner.

The invention will be better understood from the following description taken in conjunction with the accompanying drawings, in which:

FIGURE 1 shows a wound electrolytic capacitor section to which the invention is applicable; and FIGURE 2 shows a capacitor assembly with the capacitor section of FIGURE 1 enclosed in a casing and immersed in a liquid electrolyte of the present invention.

Referring now to the drawings, and in particular to FIGURE 1, there is shown a partially unrolled capacitor roll section of conventional construction comprising a pair of electrode foils 1 and 2, at least one of which is made of tantalum, aluminum, or other suitable film-forming metal which may be advantageously, although not necessarily, etched, and which has a dielectric oxide film thereon, the foils in the operation of the capacitor having opposite polarity. The dielectric oxide film may be produced by film-forming (usually anodizing) processes well known in the electrolytic capacitor art. Between foils 1 and 2 are one or more sheets of dielectric spacer material 3, 4, 5 and 6 composed of, for example, cellulosic material, including paper made of vegetable fiber, such as Benares hemp, or other suitable material, including resins, of permeable or porous impregnatable nature. Terminal or tap straps 8 and 9 are secured to the respective electrode foils and extend in opposite directions. The electrode foils and dielectric sheets are wound into a compact roll 7 prior to insertion into a casing 10 as shown in FIGURE 2.

FIGURE 2 shows the capacitor roll assembly 7 enclosed in metal casing 10 with terminals 8 and 9 extending respectively through sealing means, in one form as plugs 11 and 12 made of insulating material such as a synthetic resin. Each insulating plug 11 and 12 includes a resilient O-ring 13 and 14 arranged in a groove in the periphery of the plug and compressed by casing 10, thus providing a fluid-tight seal for the interior of the casing. Electrolyte 15, having a novel composition as more fully described hereinafter, substantially fills casing 10 and impregnates the porous spacer material.

In a polar type capacitor, only one of the electrode foils (the anode) will have an anodic dielectric oxide film thereon. In a non-polar capacitor, both electrode foils will have such films thereon.

In stead of the arrangement shown in FIGURES 1 and 2, wherein roll 7 is formed by wound cathode and anode foils, the capacitor roll may be constituted by only one electrode foil (anode) having a dielectric film thereon, the cathode being constituted by the outer casing. In such arrangement, the casing is typically made of silver or other such metal having the desirable electrical conducting as well as non-reactive characteristics.

While a rolled foil type of eletcrolytic capacitor is shown, it will be understood that other types of electrolytic capacitors employing liqiud electrolytes, such as porous anode, wire, or other well known types of capacitors, may embody the present invention for obtaining similar benefits.

The electrolyte of the present invention is composed principally of a mixture of a solvent, having an ionogen dissolved therein composed principally of an ammonium salt and tetra-methyl-guanidine. It has been found that the addition of tetra-methyl-guanidine provides an electrolytic capacitor fill electrolyte which is thermally and electrically stable at relatively higher temperatures, for example 125° C. and higher, for longer sustained periods of time than prior art electrolytic capacitors.

Tetra-methyl-guanidine (TMG) is available commercially from the American Cyanamid Company, among other sources, and is a colorless liquid, having a boiling point of 160° C. and a pH of 12.7 in a 1% aqueous solution. TMG is soluble in water and common organic solvents, and forms very stable salts. TMG is a very strong base, stronger than ammonia, and is able to displace ammonia from an ammonium salt in solution by simply adding the TMG to the mixture and heating. The chemical

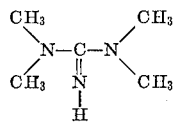

Research has revealed that when TMG is is used in an ammonium salt-solvent electrolyte to displace even a small portion of the ammonia in an ammonium salt, the thermal and electrical stability of the electrolyte is greatly improved at high temperatures of about 85° C. to 125° C., and higher. This is because the pressure inside the capacitor at elevated temperatures is lower than if TMG were not employed in the electrolyte, thereby contributing to the retention of the electrolyte for a longer time. As mentioned above, ammonium salt-solvent electrolytes without TMG are generally thermally unstable at temperatures as low as 85° C., ammonia is lost, pressure builds up within the capacitor, and electrolyte is lost, all contributing to the deterioration of the capacitor's electrical properties.

While the invention includes within its scope mixtures of ammonium salts-solvents—TMG in all proportions, particularly satisfactory results are obtained when the TMG is 10%–50% by weight of the ammonium salt. The ammonium salt component used in the electrolyte mixture is generally present in small amounts, and ordinarily an amount thereof is employed which is sufficient to provide adequate resistivity of the electrolyte for the voltage applied to the capacitor in operation. Examples of suitable ammonium salts are acetates, formates, borates, nitrates, and the like. Examples of suitable solvents are ethylene glycol, propylene glycol, dimethyl formamide, diethyl cyanamide, or other commonly used organic solvents.

Preferably, high solubility ionogens, such as the aforementioned ammonium nitrate, are used in order to obtain a broad range of resistivity for the electrolyte. From a practical standpoint, a minimum resistivity of about 10 ohm-centimeters is usually provided for the electrolyte, with the upper limit depending on the operating voltage to be applied to the capacitor. Accordingly, the ionogen used may be present in widely varying proportions from trace amounts to a saturating amount at minimum operating temperature. Mineral acids in high concentration should generally be avoided in the electrolyte to prevent hydrolysis of the solvent mixture.

Other materials as, for example, dimethylsulfoxide, N-methlyacetamide, ethylene gylcol, and dimethylacetamide may be added to the electrolyte for various purposes as, for example, to vary the viscosity of the mixture or its degree of solvent action on the other components of the capacitor or electrolyte. Thus, there may be added to the electrolyte mixture a compound such as ethylene glycol to increase the viscosity of the solvent mixture.

The following is a generalized composition for electrolytic capacitor fill electrolytes according to the invention in percent by weight:

| | Percent |
|---|---|
| Ammonium salt | 0.10–10 |
| Tetra-methyl-guanidine | 0.01–5 |
| Solvent | Balance |

One way of preparing the electrolyte is to mix the portions of ammonium salt and solvent described above. Then, TMG is added in an amount 10%–50% by weight of the ammonium salt. This mixture is heated at 125° C. for an hour, so that a predetermined amount of the ammonium is displaced by the TMG. The electrolyte is allowed to cool at room temperature, whereafter it is ready for use.

Specific examples of electrolytes according to the invention are the following:

EXAMPLE I

| | |
|---|---|
| Dimethyl formamide | 75% volume. |
| Ethylene glycol | 25% volume. |
| Ammonium pentaborate | 80 grams per liter. |
| Tetra-methyl-guanidine | 11.3 grams per liter. |

EXAMPLE II

| | Percent wt. |
|---|---|
| Butyrolactone | 39.31 |
| Dimethylacetamide | 31.11 |
| Ethylene glycol | 24.35 |
| Boric acid | 1.09 |
| Water | 1.86 |
| Ammonium pentaborate | 2.18 |
| Tetra-methyl-guanidine | 0.10 |

Life tests conducted on electrolytic capacitors containing electrolyte compositions corresponding to Example I under conditions of 125° C. at 35 volts D.C., and corresponding to Example II under conditios of 85° C. at 50 volts D.C. have shown exceedingly satisfactory operation of the capacitors for over 2,000 hours and 1,500 hours, respectively, without failure, capacitance value being maintained within relatively close limits with only minute current leakage.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What is claimed as new and desired to be secured by Letters Patent of the United States is:

1. An electrolytic capacitor comprising:
   a pair of electrodes at least one of which is composed of a film-forming metal having a dielectric film thereon; and
   an electrolyte comprising a mixture of ammonium salt, tetra-methyl-guanidine, and a solvent selected from the group consisting of non-aqueous solvent and semi-aqueous solvent, and said electrolyte contacting said electrodes.

2. An electrolytic capacitor according to claim 1, wherein said tetra-methyl-guanidine is 10–50% by weight of said ammonium salt.

3. An electrolytic capacitor according to claim 2, wherein said ammonium salt comprises 0.10–10% by weight of said mixture.

4. An electrolytic capacitor according to claim 3, wherein said ammonium salt comprises ammonium pentaborate.

5. An electrolytic capacitor according to claim 3, wherein a viscosity modifying material miscible with said mixture is incorporated therein.

6. A liquid electrolyte for electrolytic capacitors, comprising a mixture of ammonium salt, tetra-methyl-guanidine, and solvent selected from the group consisting of non-aqueous solvent and semi-aqueous solvent.

7. An electrolyte according to claim 6, wherein said tetra-methyl-quanidine is 10–50% by weight of said ammonium salt.

8. A liquid electrolyte according to claim 7 wherein said ammonium salt comprises 0.10–10% by weight of said mixture.

9. A liquid electrolyte according to claim 8, wherein ammonium salt comprises ammonium pentaborate.

10. A liquid electrolyte according to claim 8, wherein said solvent comprises a compound selected from the group consisting of ethylene glycol, propylene glycol, dimenthyl formamide, and diethyl cyanamide.

11. A liquid electrolyte according to claim 8, wherein a viscosity modifying material miscible with said mixture is incorporated therein.

References Cited

UNITED STATES PATENTS

| | | | |
|---|---|---|---|
| 2,965,690 | 12/1960 | Petersen et al. | 317—230 |
| 2,994,809 | 8/1961 | Jenny et al. | 317—230 |
| 3,138,746 | 6/1964 | Burger et al. | 317—230 |

JAMES D. KALLAM, Primary Examiner

U.S. Cl. X.R.

252—62.2